(12) United States Patent
Reine et al.

(10) Patent No.: US 8,931,316 B2
(45) Date of Patent: Jan. 13, 2015

(54) METHOD FOR PROFILING A FLAT KEY, AND FLAT KEY PRODUCED ACCORDING TO THE METHOD

(75) Inventors: Michael Reine, Essen (DE); Thomas Wallberg, Wülfrath (DE)

(73) Assignee: C. ED. Schulte Gesellschaft Mit Beschränkter Haftung Zylinderschlossfabrik, Velbert (DE)

(*) Notice: Subject to any disclaimer, the term of this patent is extended or adjusted under 35 U.S.C. 154(b) by 393 days.

(21) Appl. No.: 13/118,880

(22) Filed: May 31, 2011

(65) Prior Publication Data

US 2011/0289989 A1 Dec. 1, 2011

(30) Foreign Application Priority Data

Mar. 31, 2010 (DE) .......................... 10 2010 017 166

(51) Int. Cl.
| | |
|---|---|
| E05B 19/04 | (2006.01) |
| B23C 3/35 | (2006.01) |
| E05B 19/00 | (2006.01) |
| E05B 27/00 | (2006.01) |
| E05B 15/16 | (2006.01) |
| E05B 17/00 | (2006.01) |

(52) U.S. Cl.
CPC ............... *B23C 3/35* (2013.01); *E05B 19/0017* (2013.01); *E05B 19/0029* (2013.01); *E05B 27/0042* (2013.01); *E05B 27/0078* (2013.01); *E05B 15/1614* (2013.01); *E05B 17/0004* (2013.01); *E05B 19/0052* (2013.01); *E05B 19/0058* (2013.01)

USPC .................. 70/405; 70/406; 70/407; 70/409; 70/110; 76/110; 409/81; 409/83

(58) Field of Classification Search
USPC .............. 70/393, 402, 405, 406, 409; 76/110; 109/81–83; 409/81–83
See application file for complete search history.

(56) References Cited

U.S. PATENT DOCUMENTS

| | | | | |
|---|---|---|---|---|
| 2,855,810 | A * | 10/1958 | Brunner | 76/110 |
| 4,100,778 | A * | 7/1978 | Gretler | 70/406 |
| 4,132,151 | A * | 1/1979 | Weber | 409/82 |
| 4,453,432 | A * | 6/1984 | Widen | 76/110 |
| 5,582,050 | A * | 12/1996 | Haggstrom | 70/495 |
| 5,715,717 | A * | 2/1998 | Widen | 70/493 |
| 6,065,911 | A * | 5/2000 | Almblad et al. | 409/83 |

(Continued)

FOREIGN PATENT DOCUMENTS

| | | |
|---|---|---|
| DE | 3314511 | 10/1984 |
| DE | 3542008 | 6/1987 |

(Continued)

*Primary Examiner* — Christopher Boswell
(74) *Attorney, Agent, or Firm* — Lucas & Mercanti, LLP; Klaus P. Stoffel

(57) ABSTRACT

A method for profiling the broad sides of a flat key, a key blank being clamped in a clamping device so that the broad side of the key blank is exposed. Guide grooves and variation grooves which are complementary to the longitudinal sectional profile of the cutter teeth are milled into the broad side by advance in the longitudinal direction of the key, in one work operation, using a milling cutter that has cutter teeth on its peripheral surface and rotates about a cutter shaft. To produce undercut grooves, the axis of the cutter shaft is inclined at an angle of inclination relative to the longitudinal center plane of the key, ribs of the cutter teeth producing an undercut guide wall using at least one rib.

15 Claims, 13 Drawing Sheets

(56) References Cited

U.S. PATENT DOCUMENTS

| | | | |
|---|---|---|---|
| 6,308,543 B1* | 10/2001 | Yoshizawa | 70/492 |
| 7,412,860 B1* | 8/2008 | Field et al. | 70/340 |
| 2004/0253067 A1* | 12/2004 | Bosch | 409/132 |
| 2007/0028658 A1* | 2/2007 | Widen | 70/493 |
| 2007/0295045 A1* | 12/2007 | Neumayer | 70/409 |
| 2009/0301149 A1* | 12/2009 | Widen | 70/358 |
| 2011/0056258 A1* | 3/2011 | Widen | 70/406 |

FOREIGN PATENT DOCUMENTS

| | | |
|---|---|---|
| DE | 69421093 | 1/2000 |
| DE | 10049662 | 11/2002 |
| DE | 102005036113 | 3/2006 |
| DE | 102007057407 | 5/2009 |

* cited by examiner

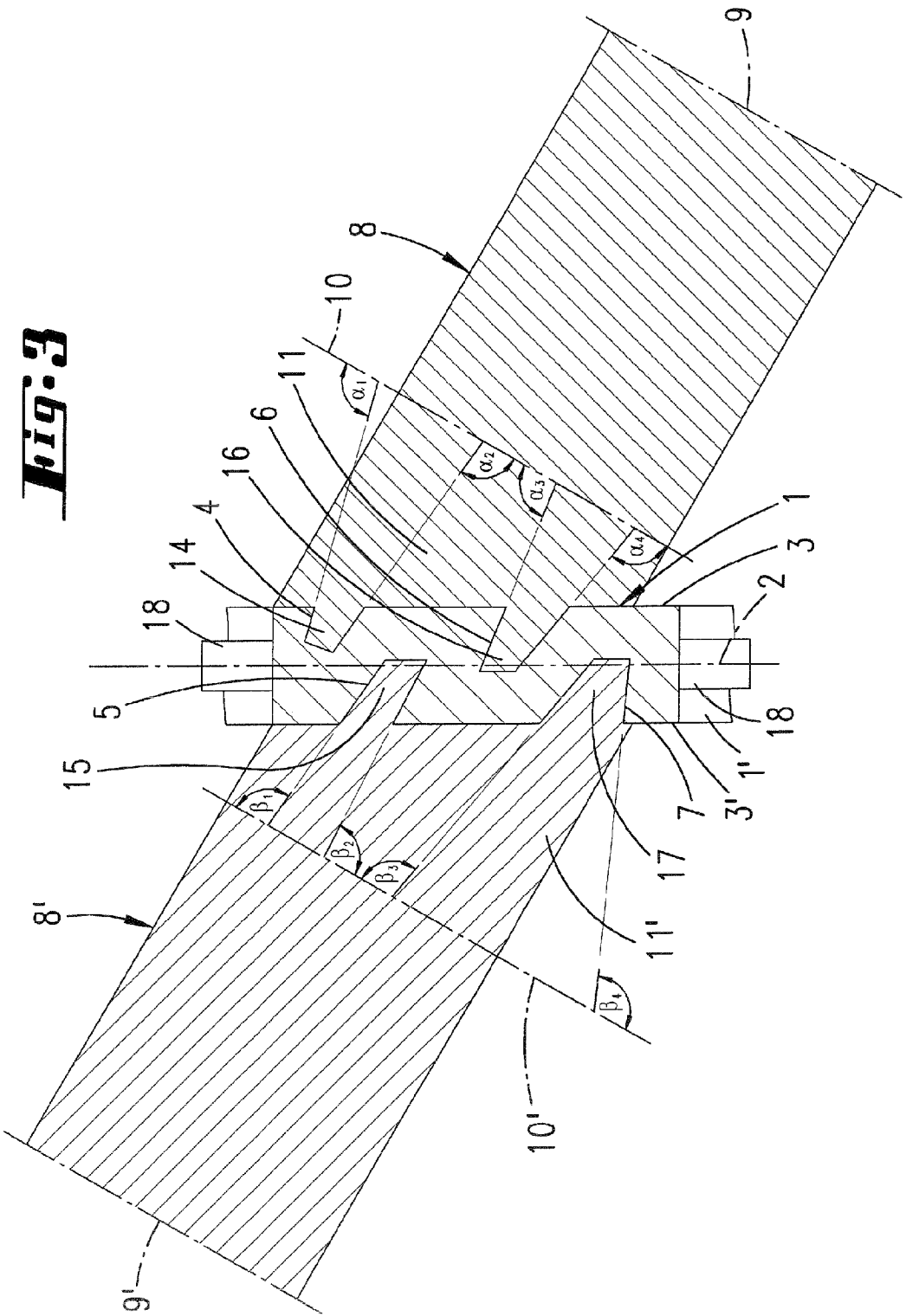

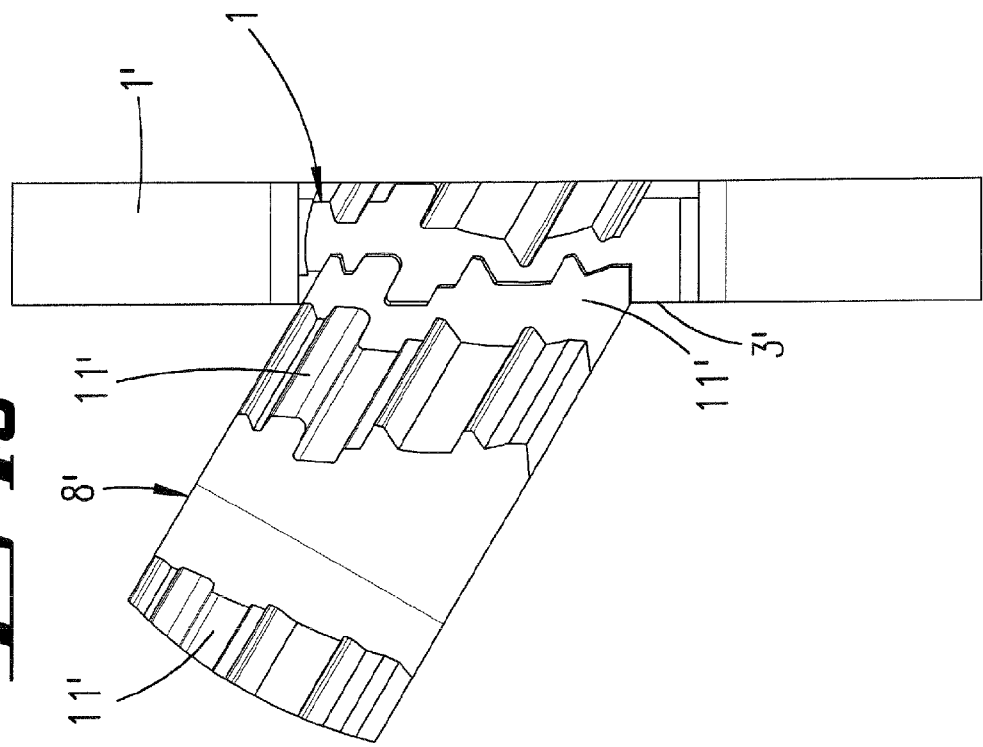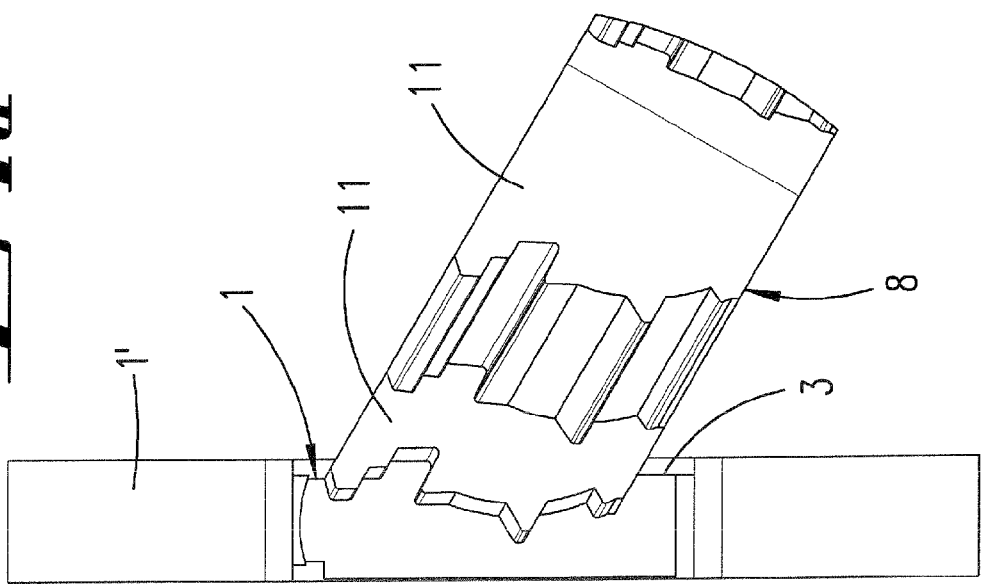

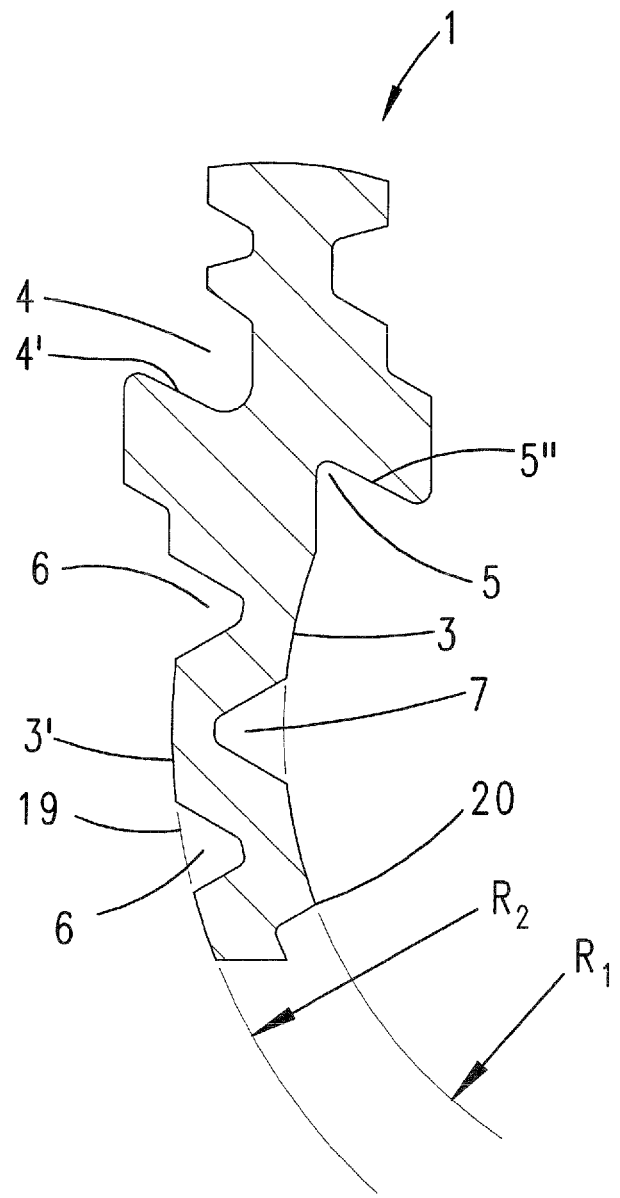

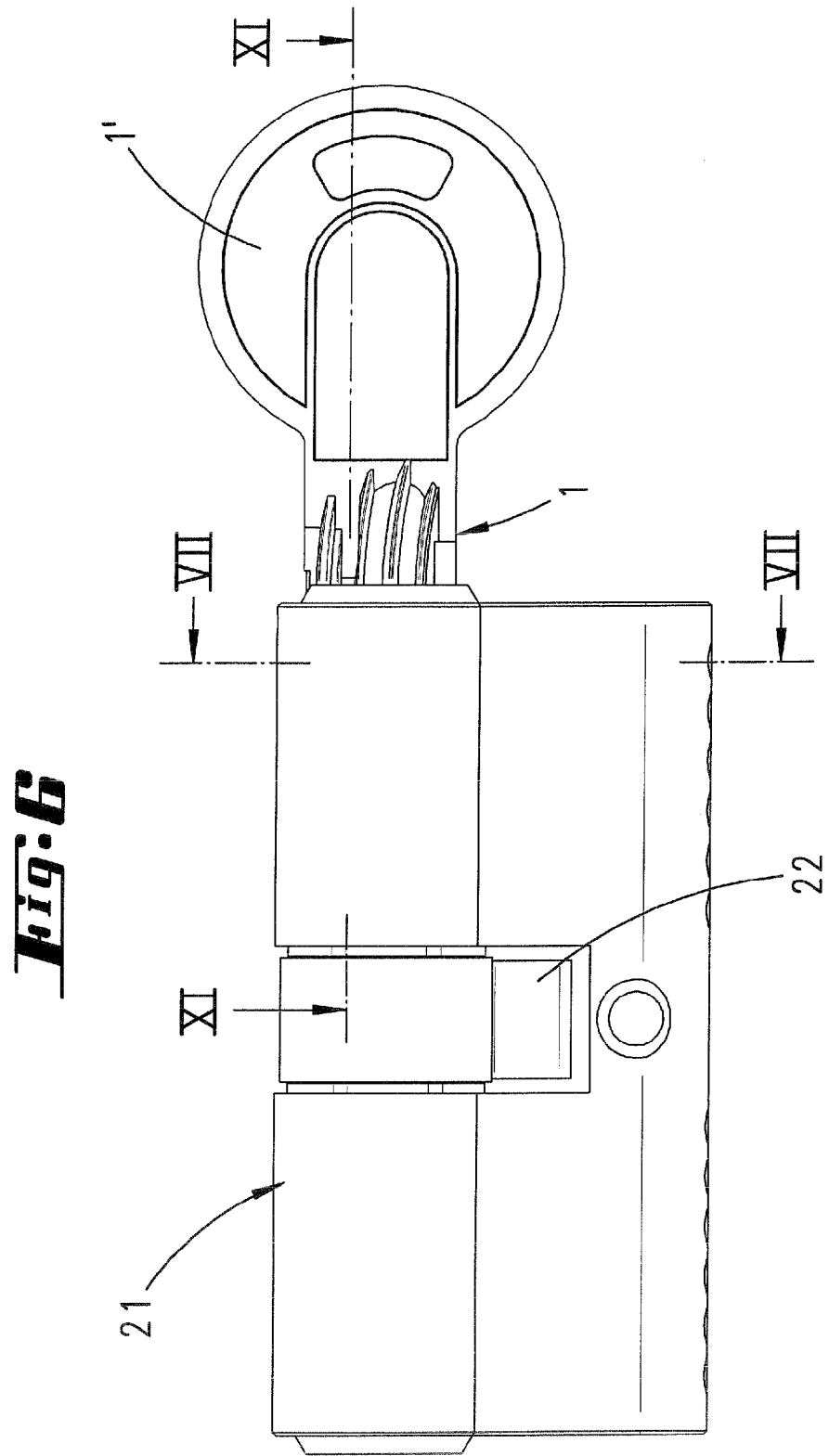

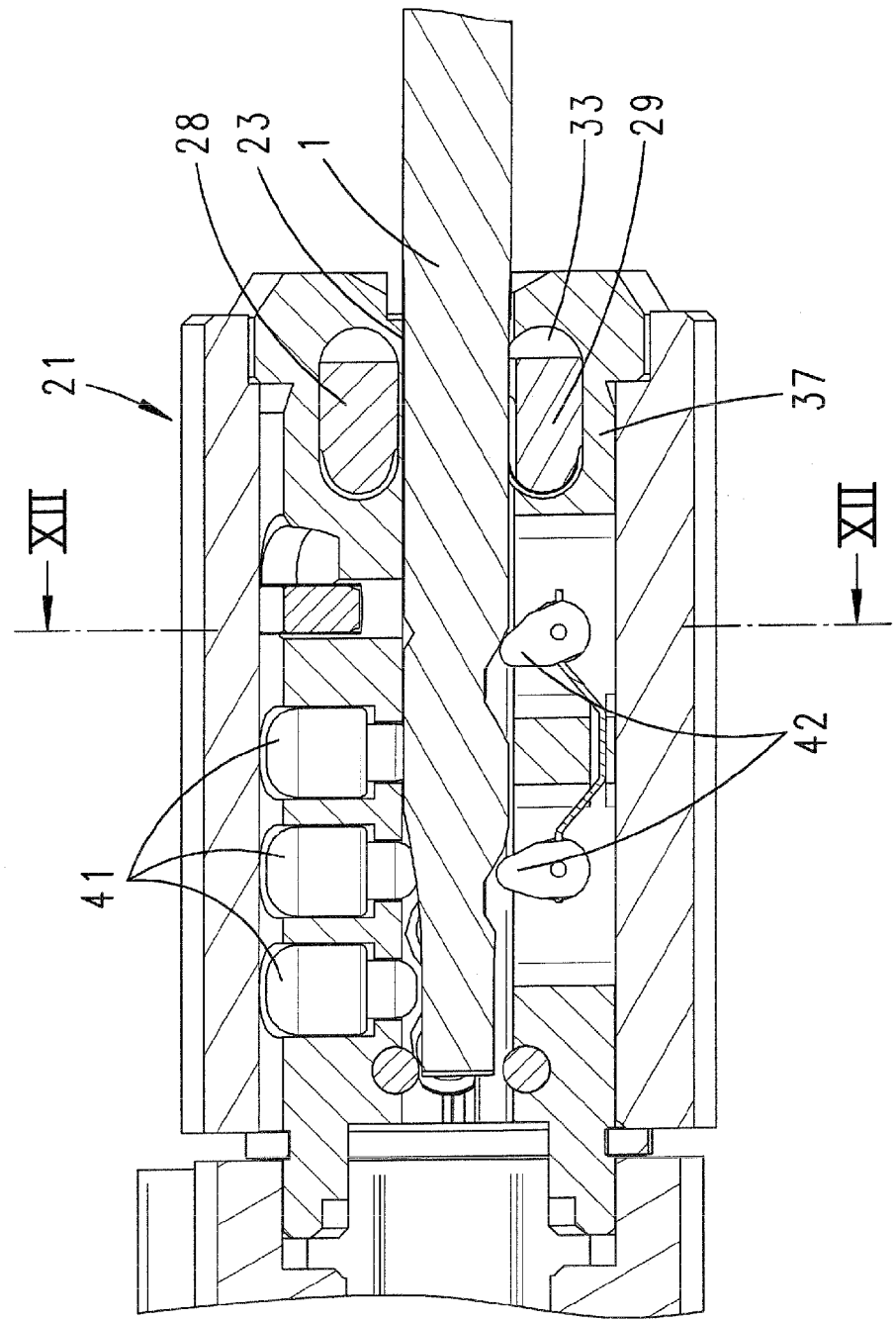

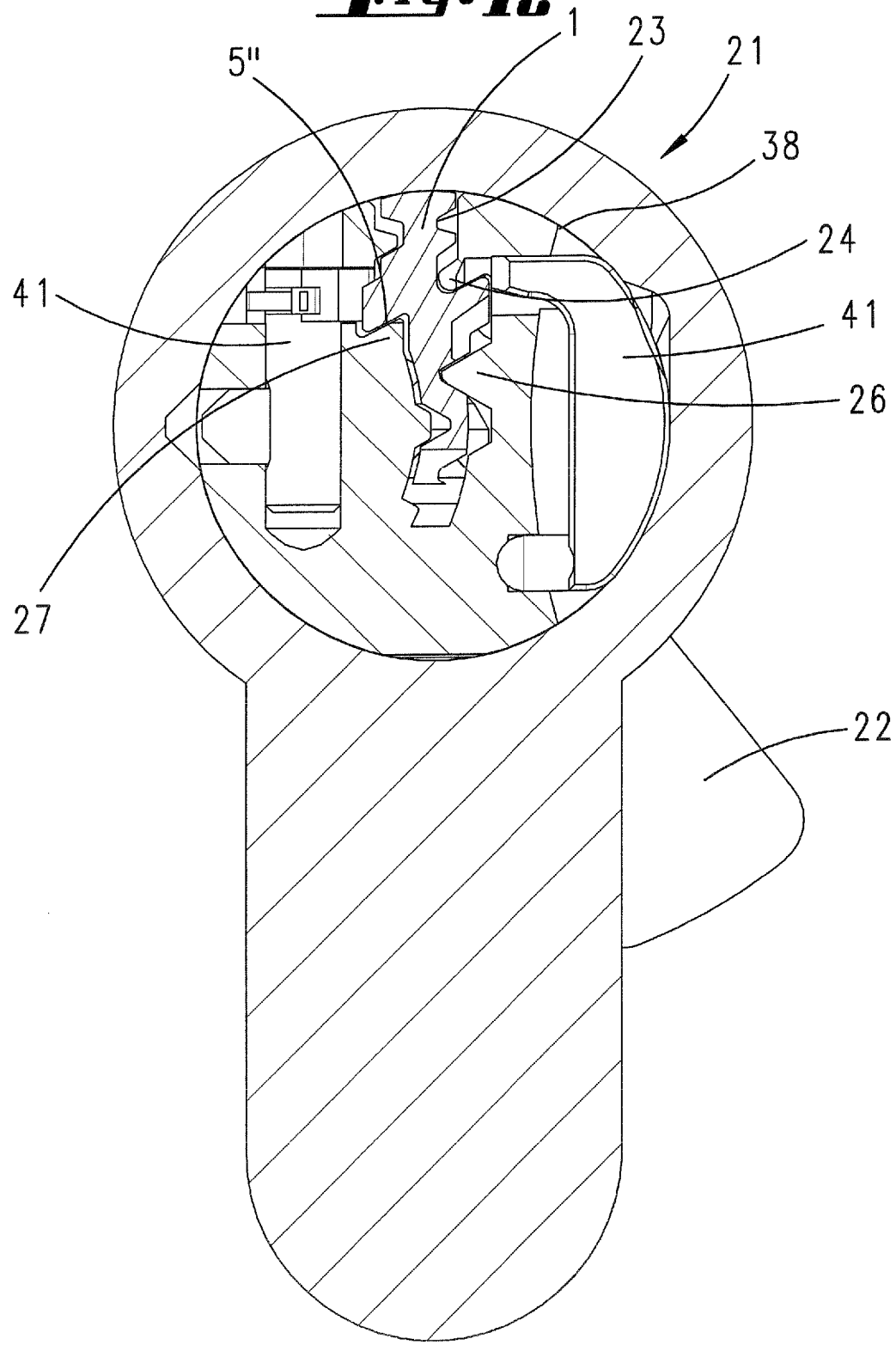

METHOD FOR PROFILING A FLAT KEY, AND FLAT KEY PRODUCED ACCORDING TO THE METHOD

CROSS-REFERENCE TO RELATED APPLICATIONS

The present application claims priority of DE 10 2010 017 166.2-14 filed May 31, 2010, the priority of this application is hereby claimed and this application is incorporated herein by reference.

BACKGROUND OF THE INVENTION

The invention relates to a method for profiling the broad side of a flat key, a key blank being clamped in a clamping device in such a way that the broad side of the key blank is exposed, guide grooves and variation grooves which are complementary to the longitudinal sectional profile of the cutter teeth being milled into the broad side in one work operation, using a milling cutter that has cutter teeth on its peripheral surface and rotates about a cutter shaft.

Flat keys produced according to a method of this kind have an elongate key shank whose broad sides are profiled with alternating grooves and ribs. The ribs and grooves extend in the direction of the longitudinal extent of the key shank. At one end, the key shank has a key tip via which the key may be inserted into a profiled key channel, which is substantially complementary to the key profile, of a lock cylinder. The key shank originates from a key bow at the end opposite from the key tip. Such flat keys have a back, which is formed by a narrow side of the key shank, and a key front face situated opposite from the back and having notched indentations of varying depths which represent the lock code. The grooves and ribs directly adjacent to the back perform a guide function in order to guide the key in the key channel of the lock cylinder. The key channel forms complementary grooves and ribs, so that in this region grooves and ribs of the key, i.e., of the walls of the key channel, interengage in a guiding manner. The portion of the key shank having the indentations is likewise provided with ribs and grooves which may have different rib heights and groove depths in order to individualize keys or locking systems. Locking hierarchies are usually developed by these variation grooves. However, locking hierarchies may also be developed by means of different profilings, i.e., rib heights and groove depths, of the guide grooves. Essentially the only difference between guide grooves and variation grooves is that the variation grooves are situated in the region of the indentations on the front side, i.e., are interrupted in places by cut edges in the longitudinal direction of the key shank.

A generic method for producing such a key is disclosed in DE 10 2007 057 407 A1. As described therein, the key blank is clamped between two clamping jaws so that one of the two broad sides is exposed. The broad sides are profiled using a milling cutter having cutter teeth on its peripheral surface which have a profile that is complementary to the profiled grooves and profiled ribs of the key shank being produced. The key is advanced in the direction of extent of the shank. The axes of the milling cutters, which are rotationally driven by an electric motor, extend parallel to the plane of the broad side of the key. This means that these axes extend perpendicularly to the surface normal of the plane of the broad side.

A similar device which may be used to carry out the generic method is disclosed in DE 100 49 662 C2. Here as well, grooves and ribs are milled parallel to the direction of extent of the key, using a milling cutter which is rotationally driven about a rotational axis that extends parallel to the plane of the broad side of the key. This method may be used to mill only grooves or ribs whose groove walls or rib walls, respectively, define a positive angle relative to the key normals. The flank angles of the cutter tooth ribs are greater than 90°. Therefore, the flank angles of the grooves are also greater than 90°. The magnitude of the clearance angle relative to the vertical is usually 3° in order to avoid harmful friction of the cutter teeth against the groove walls.

DE 694 21 093 T2 describes the production of undercut profiled grooves on a key blank, using cutting discs which are driven about rotational axes that are inclined with respect to the plane of the broad side of the key.

It is known from DE 35 42 008 to produce undercut grooves by applying a disc to the broad side of a key.

DE 33 14 511 A1 describes a flat key, wherein grooves having an undercut groove wall are cut on each of two oppositely situated broad sides.

A key profile is likewise known from DE 10 2005 036 113 A1, wherein groove walls of the profiled grooves are undercut. Here as well, the undercut grooves must be milled in a separate work operation, using inclined cutting discs.

SUMMARY OF THE INVENTION

It is an object of the invention to provide a method for producing key profiles having at least one undercut groove wall, wherein each broad side may be profiled in a single work operation.

It is first and primarily provided that the axis of the cutter shaft is inclined at an angle of inclination relative to the longitudinal center plane of the key. This angle of inclination defines the maximum possible undercut angle of the at least one undercut groove. The ribs or grooves of the cutter teeth originate from an at least virtual frustoconical lateral surface having a cone angle which corresponds to the angle of inclination. This frustoconical lateral surface is situated in the region of the cutter tooth engagement, parallel to the longitudinal center plane, i.e., the plane of the broad side of the key blank. At least one groove flank of one of the cutter teeth has a flank angle relative to the rotational axis of the milling cutter which is small enough for this cutter tooth flank to produce an undercut groove wall. In the method according to the invention, the unprofiled key is first clamped between two clamping jaws, so that one of the two mutually parallel broad sides of the key blank is exposed. The other broad side of the key blank is supported on a support surface situated between the two clamping jaws. The clamping jaws preferably engage at the two oppositely situated longitudinal narrow sides of the key shank, i.e., at the front and the back of the blank. The rotational axis of the milling cutter with which the first broad side of the key blank is profiled extends at an angle relative to the broad side of the key. The cutter ribs of the cutter teeth project from the peripheral surface of the cutter head which extends substantially on a conical lateral surface. The cutter teeth are brought into engagement with the broad side of the key blank to be machined by advancing the cutter head transverse to the milling cutter axis. Either the cutter head or the key blank is then advanced in the direction of the longitudinal axis of the key, so that a broad side surface of the key blank is machined in one work operation. After this first machining step, the key is removed from the clamping device with the aid of a gripper arm, for example, and is placed in a second clamping device, in which the already profiled broad side surface of the key shank now faces the support surface of the clamping device, so that the second broad side of the key which has not yet been profiled is exposed. This second broad side of the key is then similarly milled using a second cutter head, it being possible here as well to provide undercut groove walls in the key shank. The cutter shaft of this second milling cutter is preferably inclined by the same angle relative to the plane of the broad side of the blank. Coding notches which represent the lock code of the key are then cut into the front face of the key, these notches extending only over the region of the key shank having variation grooves or variation ribs. At least one of the guide grooves preferably has an undercut groove wall. The variation grooves preferably have no undercuts, thus avoiding sharp edges in the region of the indentation flanks of the coding notches. The key shank preferably has at least two paracentric groove pairs. There is a longitudinal plane through the key shank which in each case extends through a groove in the two broad sides. As a result, corresponding ribs which project from the walls of the key channel of the lock cylinder overlap. The angle of inclination of the cutter shaft relative to a plane of the broad side is preferably between 5° and 50°. This angle is particularly preferably between 10° and 40°. Both broad sides are preferably machined with milling cutters whose axes extend at an angle relative to the center plane of the key. These angles of inclination are preferably the same. The profiles of the key may be dry-machined when the flank angles of the cutter tooth ribs are greater than 90°, preferably greater than 92°.

The flat key produced according to the above-described method has at least one undercut groove. A groove having an undercut groove wall preferably extends in each of the two broad sides. These undercut grooves are preferably guide grooves. The coding indentations, which are introduced into the profiled key on the front side, are preferably situated only in a region of variation grooves having groove walls without undercuts. The two groove flanks of each profiled groove of the key converge in the direction of the groove base. The two flanks of each profiled rib of the key diverge in the direction of the groove base. In a refinement of the invention, it is provided that the milling cutters are profiled in such a way that they machine broad side portions of the key shank so that the surface thereof is situated on a portion of a cylindrical lateral surface. This may be an outer cylindrical lateral surface or an inner cylindrical lateral surface. These curved portions of the key shank are associated with the region of the key shank in which the coding indentations are also situated. A negatively curved portion may be situated opposite from a positively curved portion. The associated outer cylindrical lateral surface wall is part of a cylinder which is coaxial with the cylinder on the opposite side that generates the portion of an inner cylindrical lateral surface.

The invention further relates to a flat key, wherein grooves which in each case are associated with a broad side have first groove walls which are associated with a first narrow side of the key, and which have a first flank angle relative to the center plane of the key, i.e., the plane of the broad side of the key, and have second groove walls which are associated with a second narrow side of the key and which have a second flank angle. For such a key profile, it is provided that at least one first flank angle of one, preferably of each, broad side is less than 90°. However, at least one further first flank angle should be greater than 90°. The sum of the two flank angles is greater than 90°, and in particular may be at least 93°. The first flank angles are limited to a range between an angle of inclination of $\phi$ and $\phi+90°$. The angle of inclination $\phi$ is less than 90°. The undercut flank angles, which are less than 90°, are limited to the region of the guide grooves. All flank angles in the region of the profiled grooves are greater than 90°.

The invention further relates to a lock cylinder having a supplemental tumbler formed by a wear protection pin, this tumbler being displaced from a blocking position to a release position when the key is inserted. The wear protection pin is preferably acted on by the rib of the key. A stop bevel may be provided for this purpose. An undercut wall of a guide rib or an undercut wall of a guide groove is particularly suited for controlling movement of the wear protection pin from its blocking position to its release position. The wear protection pin is made of a fairly hard material, and is preferably composed of a hard metal plate. This plate is inserted into a receiving opening in the cylinder core. A further wear protection pin is preferably situated opposite the cylinder core. The wear protection pin is movable in a plane parallel to the center plane of the key, and is moved into the locked position when acted on by a spring. The wear protection pin has a recess in which the laterally projecting actuating rib of the key shank is able to engage. When the key tip is inserted into the key channel, the tip portion of this actuating rib strikes against a stop bevel in order to move the wear protection pin, which is designed as a locking pin, into its release position. The lock cylinder may also have further supplemental tumbler elements which may also be moved by swiveling from a blocking position to a release position.

The various features of novelty which characterize the invention are pointed out with particularity in the claims annexed to and forming a part of the disclosure. For a better understanding of the invention, its operating advantages, specific objects attained by its use, reference should be had to descriptive matter in which there are described preferred embodiments of the invention.

BRIEF DESCRIPTION OF THE DRAWING

In the drawing:

FIG. 3 shows an illustration corresponding to FIG. 2, but with the cutter teeth illustrated in engagement, FIG. 4a shows the cutter engagement during milling of the first broad side of the key, FIG. 4b shows the cutter engagement during milling of the second broad side of the key, FIG. 5 shows the finished key profile, FIG. 6 shows a lock cylinder with a key inserted therein, FIG. 11 shows a cross-section corresponding to line XI-XI in FIG. 6, FIG. 12 shows a cross-section corresponding to line XII-XII in FIG. 11.

DETAILED DESCRIPTION OF THE INVENTION

Figure 1:
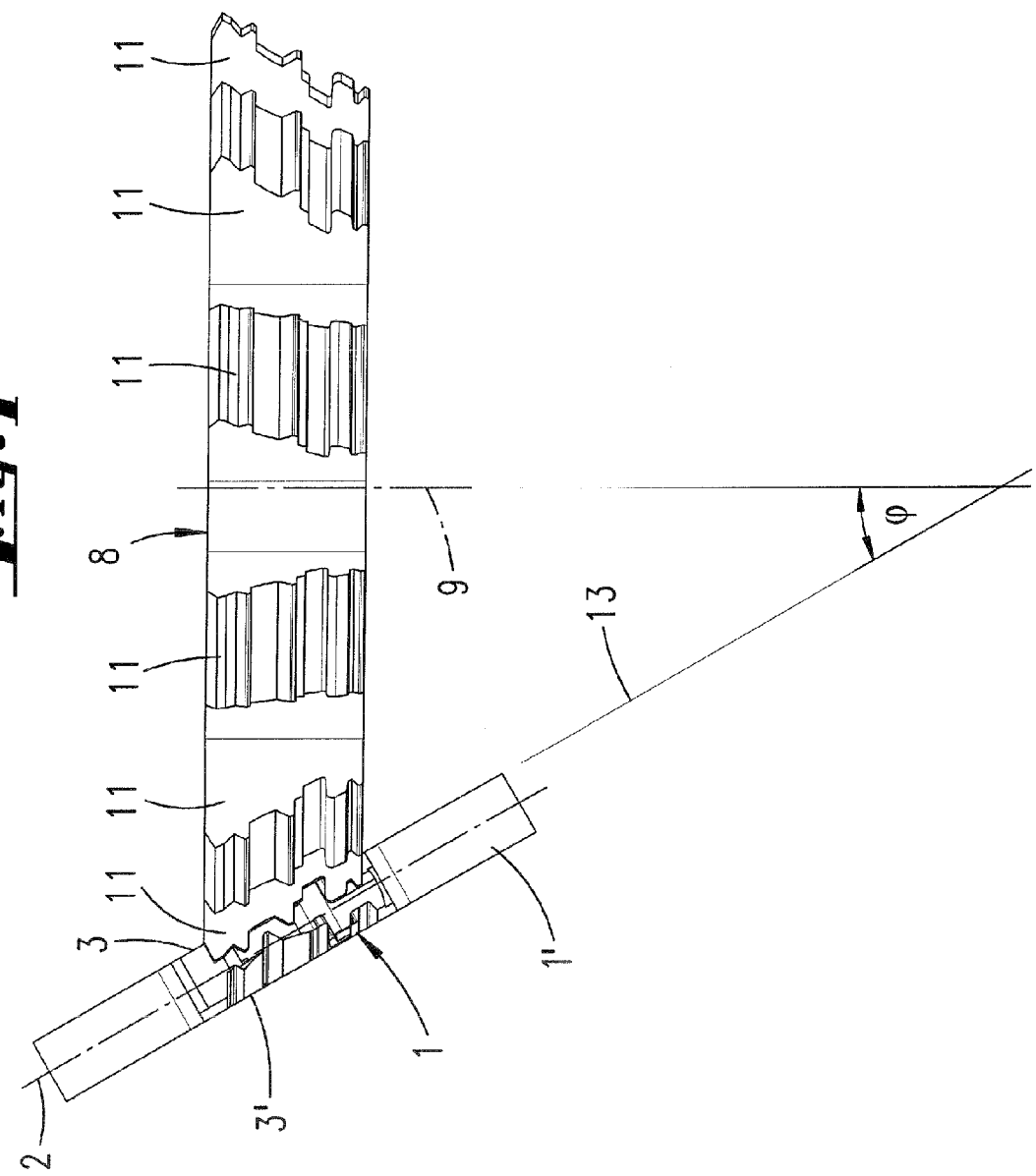
FIG. 1 shows in a rough schematic manner the spatial arrangement of a clamped key blank in relation to a milling cutter 8 which machines a broad side 3.

FIG. 1 shows the spatial relationship between the key blank 1 and the milling cutter 8. The key blank, which has a key shank having parallel broad sides 3, 3' and a key how 1', is held in a clamping device by clamping means, not illustrated, for example by the two clamping jaws 18 indicated in FIG. 2. The two planes of the broad side 3, 3' of the key, which extend parallel to the longitudinal center plane 2 of the key blank, define a reference plane. The shaft axis 9 about which a profile cutter 8 is rotated is inclined by an angle φ relative to the longitudinal center plane 2 of the key blank 1. In the exemplary embodiment, the angle of inclination φ is approximately 30°.

The milling cutter 8 has a peripheral surface which extends substantially on a conical lateral surface 13, the cone opening angle corresponding to the angle of inclination φ. As a result, a line drawn through the conical lateral surface 13 in the region of the teeth engagement the plane of the broad side of the key blank 1 extends parallel to the plane of the broad side of the key blank. The milling cutter 8 has a multiplicity of cutter teeth 11 on its peripheral surface which have cutter tooth ribs and cutter tooth grooves having a profile complementary to that of the guide grooves 4, 5 or variation grooves 6, 7 of the key to be produced.

For profiling one of the two broad sides 3, 3' of the key blank that face away from one another, the milling cutter 8 which is rotationally driven about the shaft axis 9 is advanced. In the illustration corresponding to FIG. 1, the direction of advancement corresponds to displacement of the milling cutter 8, perpendicular to the shaft axis 9, to the left. Either the milling cutter 8 or the key blank 1, i.e., the clamping device gripping the key blank 1, is then displaced in the direction of extent of the key shank. In the illustration corresponding to FIG. 1, this displacement occurs perpendicular to the plane of the drawing.

Figure 2:
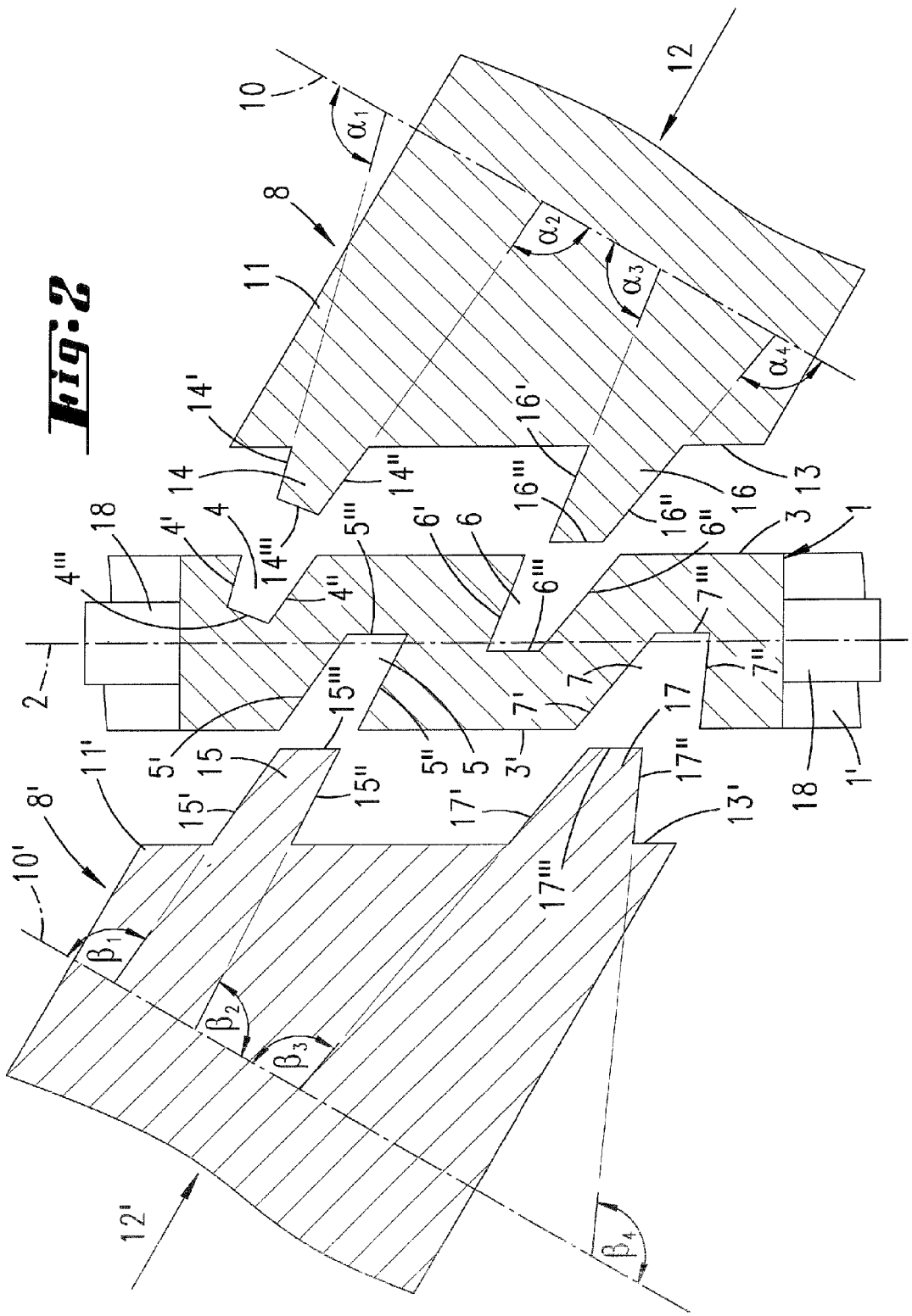
FIG. 2 shows an enlarged illustration which schematically shows the key blank 1 which is machined on both sides, and the two cutter teeth 11, 11' which machine the broad side profile.

FIG. 2 schematically shows, in a direct comparison, the cross-section of a milling cutter 8, which profiles the broad side 3 of the key, and the cross-section of a milling cutter 8', which profiles the opposite broad side 3' of the key face. Also indicated in FIG. 2 are two clamping jaws 18 which clamp the key front face and the key back face therebetween.

The milling cutter 8 has a multiplicity of cutter teeth 11, only one of which is illustrated in cross-section. For simplicity, the cutter tooth 11 is illustrated with only one cutter tooth rib 14 for producing a guide groove 4, and only one cutter tooth rib 16 for producing a variation groove 6. In this case, both ribs 14, 16 originate from a conical lateral surface 13. The conical lateral surface 13 may be an imaginary plane. For producing more complex key profiles, such as that shown in FIG. 5, for example, milling cutters 8 are used in which the conical lateral surface 13 is not physically provided.

Milling cutter 8' is likewise illustrated with only two ribs 15, 17, one rib 15 milling a guide groove 5 and one rib 17 milling a variation groove 7. Here as well, both cutter tooth ribs 15, 17 originate from a physically provided conical lateral surface 13'.

Auxiliary lines 10, 10' extend parallel to the shaft axes 9, which are not illustrated in FIG. 2 but are illustrated in FIG. 3. The auxiliary lines 10, 10' are used to show the flank angles $\alpha_1$ through $\alpha_4$ and $\beta_1$ through $\beta_4$ of flank angles 14', 14", 15', 15", 17', 17", 16', 6" of the cutter tooth ribs 14, 15, 16, 17, respectively.

The cutter tooth rib 14 has two cutting flanks 14', 14" which converge at an acute angle, and an inclined cutter tooth head line 14'". Angles $\alpha_1$, $\alpha_2$, by which the cutter tooth flanks 14', 14" are respectively inclined with respect to the shaft axis 9, i.e., auxiliary line 10, are greater than 90°. However, it is apparent from FIG. 2 that the groove wall 4' of the guide groove 4 produced by the cutter tooth flank 14' is an undercut groove. The cutter tooth 8 is advanced in the direction of advancement denoted by reference numeral 12. A flatly extending groove flank 4" is produced by the cutter tooth flank 14".

A similar, likewise undercut guide groove 5 is milled using the cutter tooth rib 15 of the milling cutter 8'. Here as well, the flank angles $\beta_1$, $\beta_2$ respectively defined by the cutter tooth flanks 15', 15" relative to the rotational axis, i.e., auxiliary line 10, are greater than 90°. In this case, the head line 15'" extends parallel to the longitudinal center plane 2, resulting in a groove base 5'" which extends parallel to the longitudinal center plane 2.

A variation groove 6 is milled using the cutter tooth rib 16 of the milling cutter 8. In this case, the head line 16'" of the cutter tooth rib 16 extends at an angle relative to the rotational axis 9 such that a groove base 6'" is produced which extends parallel to the longitudinal center plane 2.

The two grooves 6, 5 are paracentric with respect to one another, since the longitudinal center plane 2 extends through groove 5 as well as through groove 6 on the oppositely situated broad side.

Groove 6 is likewise paracentric with respect to variation groove 7, which is associated with the oppositely situated broad side 3' and which likewise has a groove base 7'" extending parallel to the longitudinal center plane 2. The groove walls 6', 6" of the variation groove 6, the same as the groove walls 7', 7" of the variation groove 7, may have no undercuts. The flank angles $\alpha_3$, $\alpha_4$ of flanks 16', 16", respectively, relative to the auxiliary line 10, i.e., the shaft axis 9, have corresponding values. The values of flank angles $\beta_3$ and $\beta_4$ of flanks 17', 17", respectively, may also be such that the groove walls 7', 7" produced by the flanks 17', 17" have no undercuts.

Whereas the method has been explained in a strictly schematic manner with reference to previously described FIGS. 1 through 3, a first exemplary embodiment for producing a key profile is explained below with reference to FIGS. 4a through 5. The key shank of the key blank 1 is once again clamped in a clamping device. The milling cutter 8 is used to introduce a corresponding broad side profile into the broad side 3 of the key blank. It is apparent that a guide groove 5 having only a single groove wall 5" is undercut, since the single groove wall 5" of this guide groove 5 has a negative angle relative to the surface normal of the broad side of the key.

In the region of the variation groove 7, the finished milled broad side of the key shank extends along an inner cylindrical lateral surface, the cylinder generating this inner cylindrical lateral surface having a radius $R_1$. A likewise curved broad side portion 19 is situated opposite from this curved broad side portion 20. The broad side portion 19 extends on a portion of an outer cylindrical lateral surface wall having a radius $R_2$. $R_1$ and $R_2$ originate from the same center point. Two variation grooves 6 are situated in the curved broad side portion 19.

The milling cutter 8' which machines the plane of the broad side 3' has a cross-sectional contour line of the cutter tooth 11' with an appropriate curvature for milling the cylindrical surface portion 19. Cutter ribs for producing the guide groove 4 and the two variation grooves 6 project from a base area which extends on an imaginary conical lateral surface. The portion of the cutter tooth which produces the guide groove 4 is designed in such a way that the guide groove 4 has an undercut groove flank 4'.

FIG. 6 shows a lock cylinder 21 designed as a double locking cylinder. When the appropriate key 1 is inserted into the key channel 23 in question, a lock member 22 may be turned by one of the two cylinder cores which are each rotatably situated in a cavity in the housing of the lock cylinder 21.

Supported in the profile portion of the cylinder housing on the base of a pin hole is a pin spring 36 which acts on a housing pin 35 to move same into a locked position. A core pin 34 is also inserted in the pin hole. Overall, a multiplicity of such pin tumblers 34, 35 are provided which in each case may be sorted by the coding indentations of the key 1 into their release position (FIG. 9) in which the cylinder core 37 may be turned.

A hard metal plate 28 which forms a wear protection pin is inserted into a cutout provided near the opening of the key channel 23. Situated on the opposite side of the key channel 23 is a bearing opening 33, having the same configuration, which extends parallel to the broad side of the key that is inserted into the key channel 23. A further wear protection pin 29 is displaceably supported in this bearing opening 33. Such wear protection pins are known from DE 10 2007 007 688 A1. Therefore, reference is made to this published document with regard to the mode of operation of these wear protection pins 28, 29.

The movable wear protection pin 29 has a recess 39 in which a profiled rib of the key is able to engage. This is a profiled rib whose rib wall is formed by the undercut wall 5" of the guide groove 5.

Figure 7:
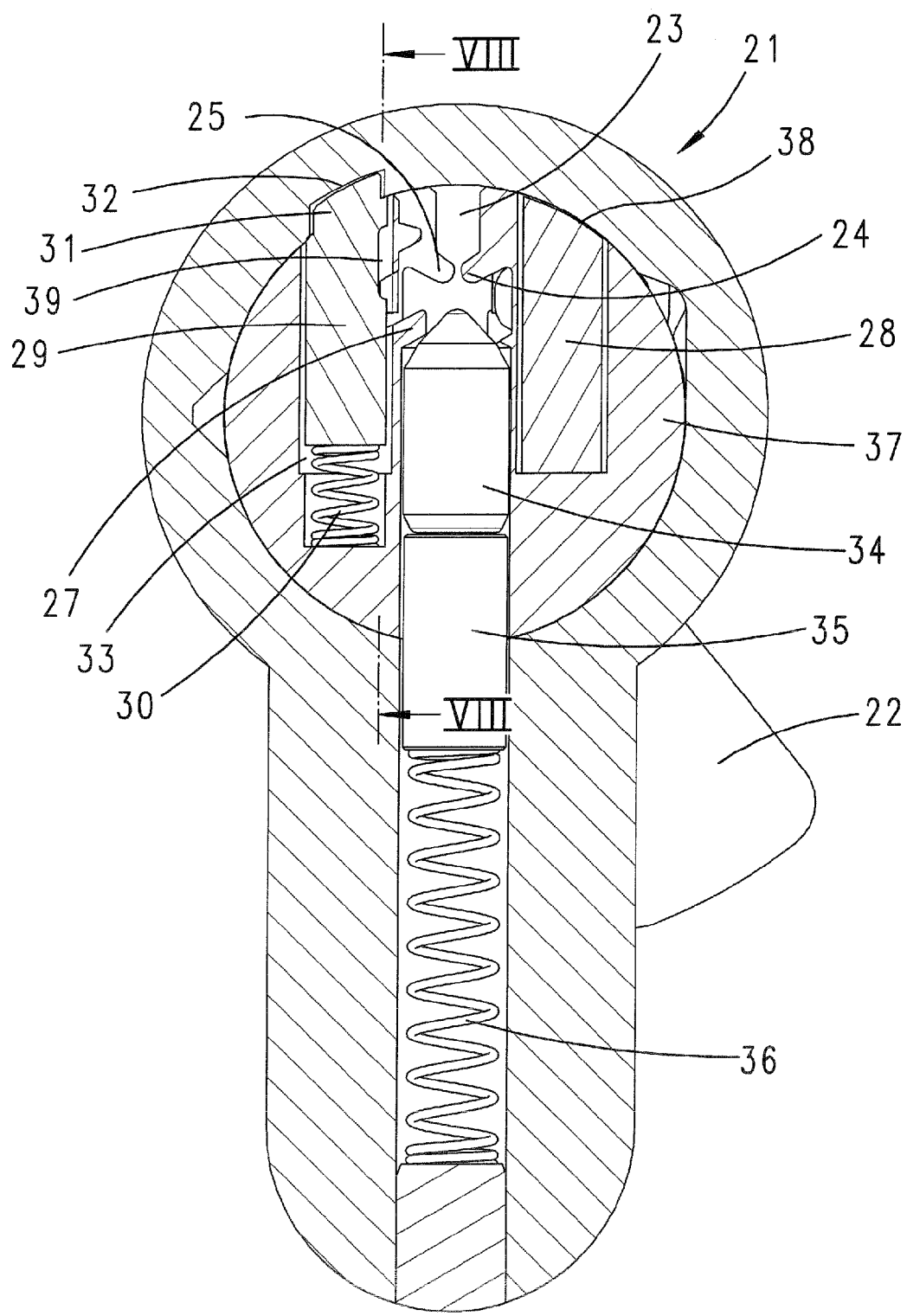
FIG. 7 shows a cross-section corresponding to line VII-VII in FIG. 6, with the key not inserted.
Figure 8:
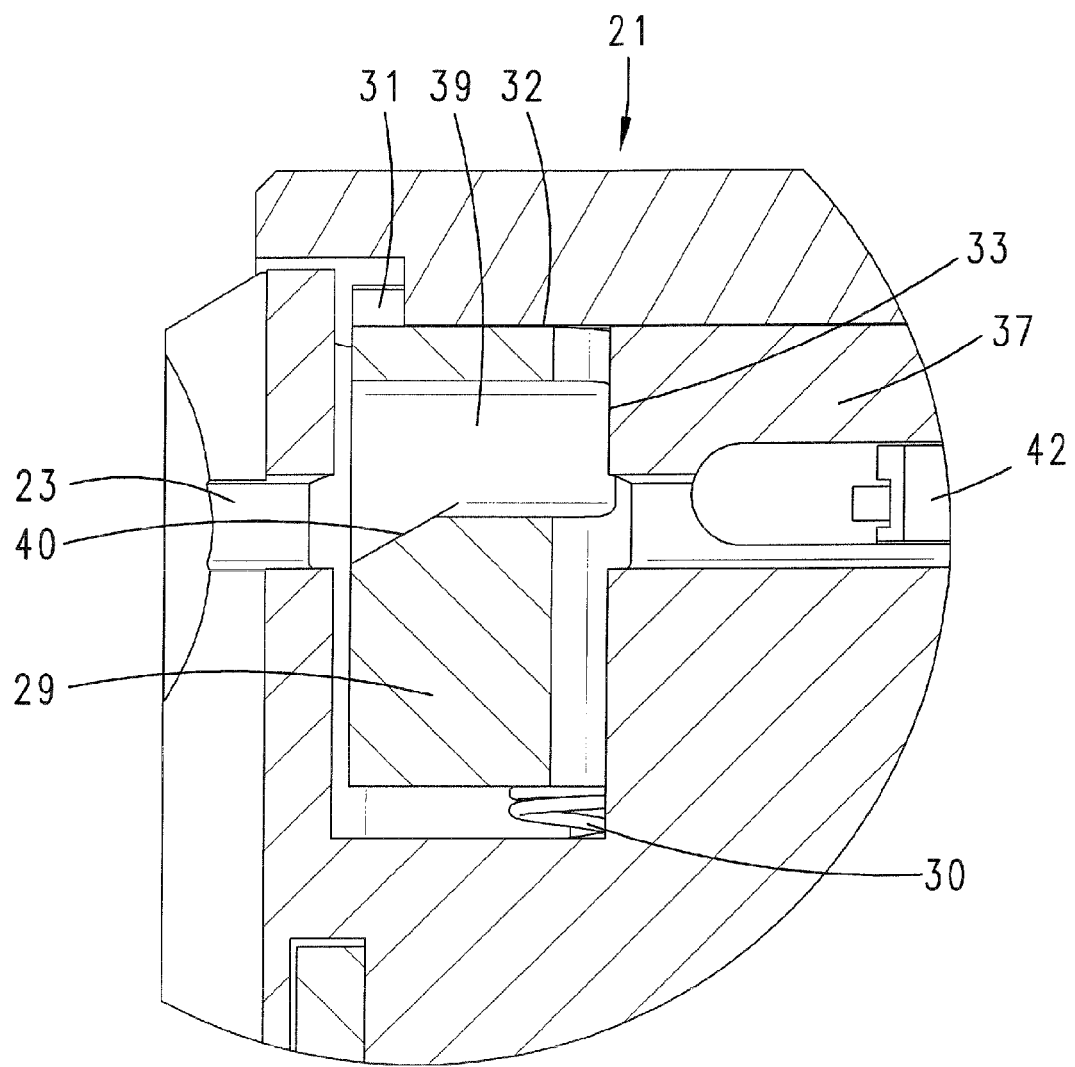
FIG. 8 shows a cross-section corresponding to line in FIG. 7.

As shown in FIG. 8, the recess 39 enlarges toward the opening in the key channel 23, forming a stop bevel 40. With the key 1 not inserted, a locking extension 31 of the wear protection pin 29 having a reduced cross-section projects into a locking receptacle 32 in the cylinder housing. The spring 30 acts on the wear protection pin 29 in this direction (see FIG. 7).

Figure 9:
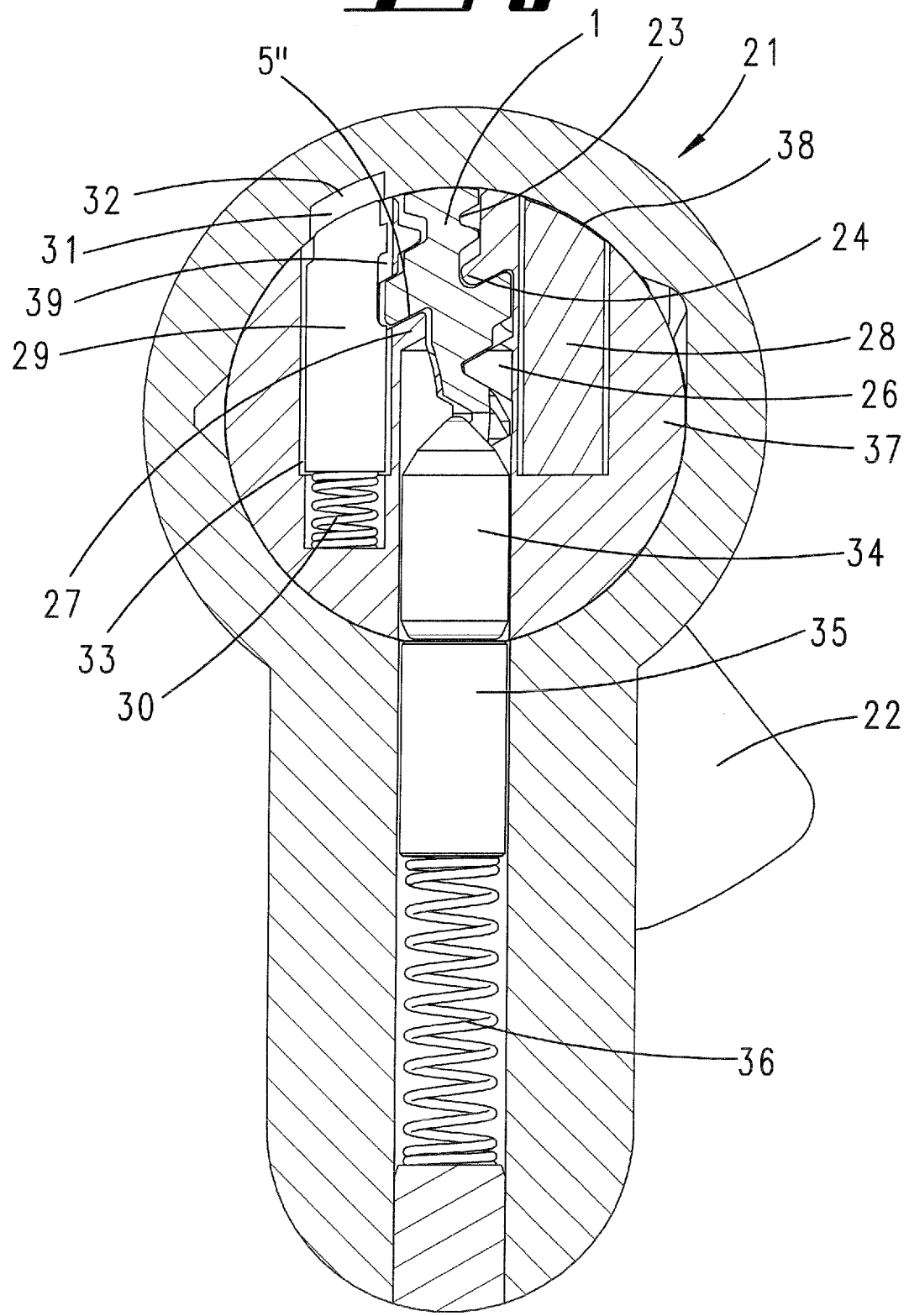
FIG. 9 shows an illustration corresponding to FIG. 7, with the key inserted.
Figure 10:
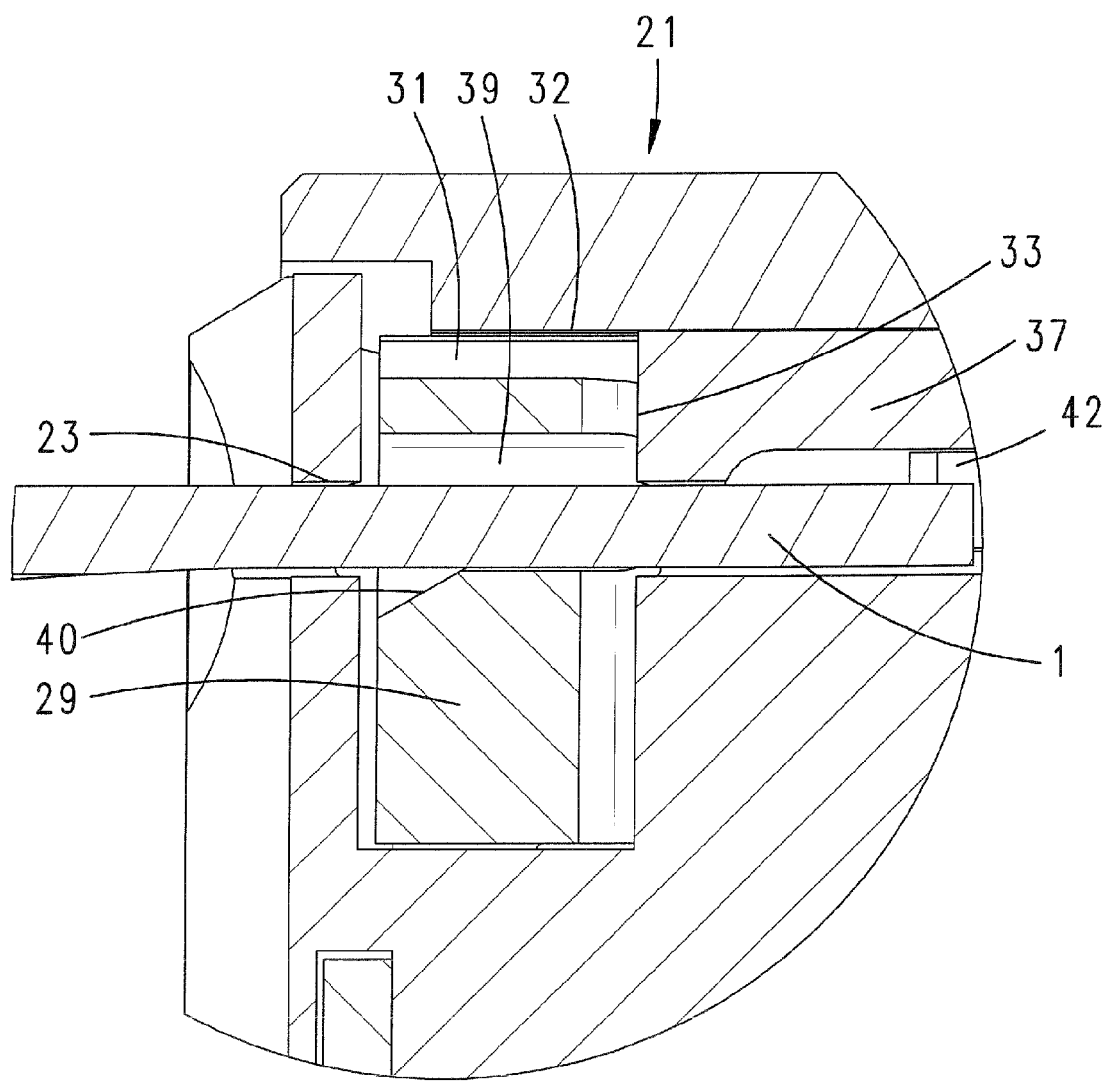
FIG. 10 shows an illustration corresponding to FIG. 8, with the key inserted.

When a key 1 is inserted into the key channel 23, a front portion of the groove wail 5" slides against the stop bevel 40 and moves the wear protection pin 29 into the position illustrated in FIG. 9. This causes the wear protection pin 29 to be moved against the restoring force of the spring 30, so that the locking extension 31 of the wear protection pin leaves the locking receptacle 32. When the key is completely inserted, the wear protection pin 29 is held in the release position illustrated in FIG. 10 by the actuating rib which forms the flank 5".

FIGS. 11 and 12 show further tumbler elements, which prevent the cylinder core 37 situated in a core hole 38 from twisting when the key is not inserted. The supplemental tumbler pins 41 may be swiveled back and forth about a pivot axis which is parallel to the rotational axis of the cylinder core 37, between a blocking position and a release position. The supplemental tumblers 41 have sampling heads which are used to sample a profile of the key shank.

Pivot pins 42 are also provided, which likewise have sampling heads that sample the broad side profilings of the key shank in order to move a blocking end from a blocking position to a release position.

Figure 14:
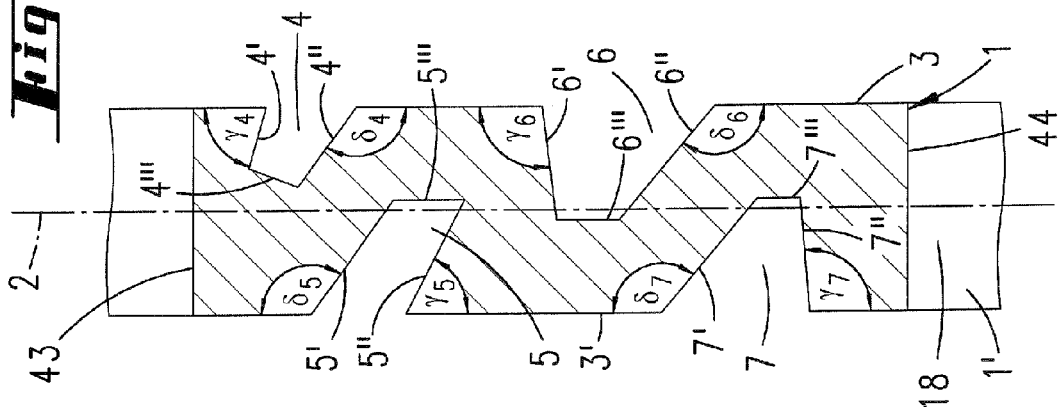
FIG. 14 shows a cross-section corresponding to line XIV-XIV in FIG. 13 for illustrating the flank angles.
Figure 13:
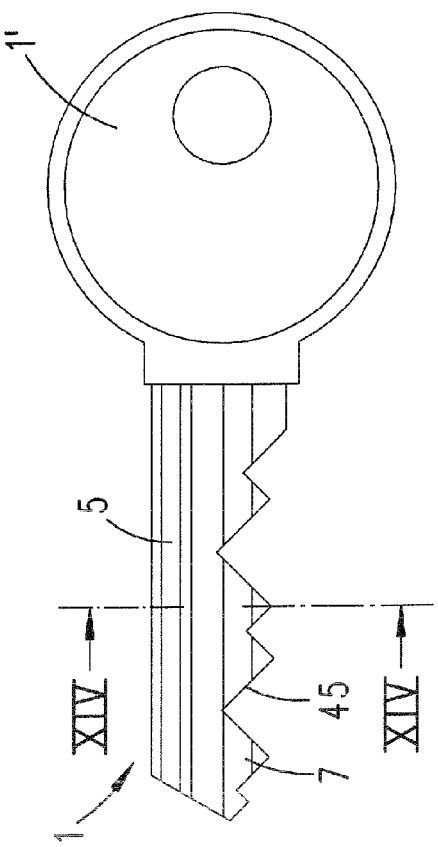
FIG. 13 shows the view of a broad side of a flat key.

FIG. 13 shows the view of a broad side of a flat key in a preferred exemplary embodiment the invention. FIG. 14 shows a cross section of the key shank, and in particular shows the flank angles of the grooves 4, 5, 6, 7 cut into the broad sides 3, 3' of the key. With regard to the broad side 3 of the key, the narrow side 43 of the key forms a first narrow side with which the first groove flanks 4', 6' are associated. Flank angle $\gamma_4$ of groove flank 4' is less than 90°. Flank angle $\gamma_6$ of groove flank 6' is greater than 90°. Both flank angles $\gamma_4$, $\gamma_6$ are greater than an angle of inclination $\phi$, and may have a maximum value which is maximum 90°, greater than the angle of inclination $\phi$.

The oppositely situated broad side 3' of the key also has such first groove flanks 5", 7". In this case the narrow side 44 of the key opposite from the narrow side 43 of the key forms a first narrow side with which at least one undercut groove flank 5" is associated. The groove flank 7" of groove 7 has a flank angle $\gamma_7$ which is greater than 90°.

The groove flanks 4", 6", 5', 7' opposite from the respective first groove flanks 4', 6', 5", 7" have a larger flank angle $\delta_4$, $\delta_5$, $\delta_6$, $\delta_7$. The sum of each second flank angle and the respective first flank angle $\gamma_4$, $\gamma_5$, $\gamma_6$, $\gamma_7$ is greater than 180°.

It is shown in FIG. 13 that grooves 6, 7, whose flank angles $\gamma_6$, $\delta_6$ and $\gamma_7$, $\delta_7$, respectively, are each greater than 90°, form variation grooves. These grooves 6, 7 are situated in a region in which coding recesses 45 are milled on the front side. In this case, the key front face is formed by the narrow side 44 of the key. The narrow side 43 of the key opposite from the key front face 44 forms a key back face which is adjacent to guide grooves 4, 5. The two guide grooves 4, 5 each have just one groove flank 4', 5" that has a flank angle $\gamma_4$, $\gamma_5$ which is less than 90°. Both guide grooves 4, 5 are undercut on one side. On the other hand, none of the variation grooves 6, 7 have undercuts, and instead have groove flank angles $\gamma_6$, $\delta_6$, and $\gamma_7$, $\gamma_7$, respectively, which are greater than 90°, preferably greater than 93°.

While specific embodiments of the invention have been shown and described in detail to illustrate the inventive principles, it will be understood that the invention may be embodied otherwise without departing from such principles.

LIST OF REFERENCE NUMERALS

1 Key blank
1' Key bow
2 Longitudinal center plane
3 Broad side surface
3' Broad side surface
4 Guide groove
4' Groove flank
4" Groove flank
5 Guide groove
5' Groove flank
5" Groove wall, groove flank
5''' Groove base
6 Variation groove
6' Groove wall, groove flank
6" Groove wall, groove flank
6''' Groove base
7 Variation groove
7' Groove wall, groove flank
7" Groove wall, groove flank
7''' Groove base
8 Milling cutter
8' Milling cutter
9 Shaft axis
10 Auxiliary line parallel to shaft axis
11 Cutter tooth
12 Direct ion of advancement
13 Conical lateral surface
13' Conical lateral surface
14 Cutter tooth rib
14' Cutter tooth flank
14" Cutter tooth flank
14''' Cutter tooth head line
15 Cutter tooth rib
15' Cutter tooth flank
15" Cutter tooth flank
15''' Cutter tooth head line
16 Cutter tooth rib
16' Cutter tooth flank
16" Cutter tooth flank 16''' Cutter tooth head line
17 Cutter tooth rib
17' Cutter tooth flank
17'' Cutter tooth flank
18 Clamping jaw
19 Cylindrical surface portion
20 Cylindrical surface portion
21 Lock cylinder
22 Lock member
23 Key channel
24 Profiled rib
25 Profiled rib
26 Profiled rib
27 Profiled rib
28 Wear protection pin
29 Wear protection pin
30 Spring
31 Locking extension
32 Locking receptacle
33 Bearing opening
34 Core pin
35 Housing pin
36 Pin spring
37 Cylinder core
38 Core hole
39 Recess
40 Stop bevel
41 Supplemental tumbler
42 Pivot pins
43 Narrow side of key
44 Narrow side of key
$R_1$ Radius
$R_2$ Radius
$\alpha_1$ Flank angle
$\alpha_2$ Flank angle
$\alpha_3$ Flank angle
$\alpha_4$ Flank angle
$\beta_1$ Flank angle
$\beta_2$ Flank angle
$\beta_3$ Flank angle
$\beta_4$ Flank angle
$\delta_4$ Flank angle
$\delta_5$ Flank angle
$\delta_6$ Flank angle
$\delta_7$ Flank angle
$\gamma_4$ Flank angle
$\gamma_5$ Flank angle
$\gamma_6$ Flank angle
$\gamma_7$ Flank angle
$\phi$ Angle of inclination

We claim:

1. A method for profiling at least one broad side of a flat key, comprising the steps of: clamping a key blank in a clamping device so that the broad side of the key blank is exposed; and milling guide grooves and variation grooves which are complementary to a longitudinal sectional profile of cutter teeth into the broad side by advancing in a longitudinal direction of the key, in one work operation in a single pass of the key blank, using a milling cutter that has cutter teeth on its peripheral surface and rotates about a cutter shaft, the milling producing an undercut guide wall using at least one rib by inclining a rotational axis of the cutter shaft at an angle of inclination relative to a longitudinal center plane of key ribs of the cutter teeth that is greater than 0° and less than 90°.

2. The method according to claim 1, wherein all the variation grooves have groove walls which have no undercuts.

3. The method according to claim 1, comprising at least two paracentric groove pairs.

4. The method according to claim 1, wherein the angle of inclination is between 5° and 50°.

5. The method according to claim 4, wherein the angle of inclination is between 10° and 40°.

6. The method according to claim 1, including machining each of two broad sides using a milling cutter whose cutter shaft axes are inclined with respect to the longitudinal center plane of the key by an angle of inclination.

7. The method according to claim 6, wherein the angle of inclination is the same for the cutter shaft axes.

8. The method according to claim 1, wherein flanks have flank angles, respectively, relative to the cutter axis which are >90°.

9. The method according to claim 8, wherein the flank angles are >92°.

10. A flat key produced according to the method of claim 1, comprising at least one guide groove having an undercut groove wall in which all variation grooves situated in a region of coding indentations on a front side have walls, respectively, which have no undercuts.

11. The flat key according to claim 10, wherein a broad side portion, extending on a cylindrical lateral surface, has the variation grooves.

12. The flat key according to claim 10, wherein a first broad side portion extends on an outer cylindrical lateral surface, and a second broad side portion situated opposite from the first broad side portion extends on an inner cylindrical lateral surface, the two cylindrical lateral surfaces being concentric.

13. A lock cylinder with a flat key according to claim 10, comprising a wear protection pin that is displaceable a wall, of a guide groove or a guide rib, from a locked position to a release position when the key is inserted into a key channel of the lock cylinder.

14. A lock cylinder according to claim 13, wherein the wall is an undercut wall.

15. A flat key produced according to the method of claim 1, wherein all grooves associated with a broad side of the key respectively, have first groove walls associated with a first narrow side of the key, respectively, the first groove walls having a first flank angle relative to a center plane of the key, and have second groove walls which are associated with a second narrow side of the key, respectively, the second groove walls having a second flank angle relative to the center plane of the key, at least one first flank angle of one, broad side being less than 90°, the first flank angle of each of the grooves being in a range of a specified angle of inclination of $\phi$ and $\phi+90°$, and the second flank angle of each of the grooves being in a range of the angle of inclination of $\phi+90°$ and 180°, the angle of inclination being greater than 0° and less than 90°, wherein all groove walls extending in a region of coding indentations on a front face of the key have flank angles, respectively, which are greater than 90°.

* * * * *

UNITED STATES PATENT AND TRADEMARK OFFICE
CERTIFICATE OF CORRECTION

| | | |
|---|---|---|
| PATENT NO. | : 8,931,316 B2 | Page 1 of 1 |
| APPLICATION NO. | : 13/118880 | |
| DATED | : January 13, 2015 | |
| INVENTOR(S) | : Michael Reine | |

It is certified that error appears in the above-identified patent and that said Letters Patent is hereby corrected as shown below:

On The Title Page, item (30) should read

-- (30)   Foreign Application Priority Data

May 31, 2010   (DE) ...........................10 2010 017 166 --.

Signed and Sealed this
Twelfth Day of May, 2015

Michelle K. Lee
*Director of the United States Patent and Trademark Office*